(12) United States Patent  
Puoskari

(10) Patent No.: US 12,035,662 B2
(45) Date of Patent: Jul. 16, 2024

(54) FEEDING DEVICE AND FEEDING METHOD ON HANDLING TIMBER

(71) Applicant: PONSSE OYJ, Vieremä (FI)

(72) Inventor: Jussi Puoskari, Kuopio (FI)

(73) Assignee: PONSSE OYJ, Vieremä (FI)

( * ) Notice: Subject to any disclaimer, the term of this patent is extended or adjusted under 35 U.S.C. 154(b) by 711 days.

(21) Appl. No.: 17/279,279

(22) PCT Filed: Sep. 19, 2019

(86) PCT No.: PCT/FI2019/050671
§ 371 (c)(1),
(2) Date: Mar. 24, 2021

(87) PCT Pub. No.: WO2020/065128
PCT Pub. Date: Apr. 2, 2020

(65) Prior Publication Data
US 2022/0030782 A1 Feb. 3, 2022

(30) Foreign Application Priority Data
Sep. 25, 2018 (FI) .................... 20185798

(51) Int. Cl.
*A01G 23/099* (2006.01)
*B27B 17/12* (2006.01)
*A01G 23/091* (2006.01)

(52) U.S. Cl.
CPC ............ *A01G 23/099* (2013.01); *B27B 17/12* (2013.01); *A01G 23/091* (2013.01)

(58) Field of Classification Search
CPC .... A01G 23/099; A01G 23/091; B27B 17/12; F16N 19/00
See application file for complete search history.

(56) References Cited

U.S. PATENT DOCUMENTS 4,016,956 A * 4/1977 Karlsson ................. B27B 17/12
184/32
6,149,037 A * 11/2000 Berrend .................... F16N 7/00
222/326

(Continued)

FOREIGN PATENT DOCUMENTS

| FI | 125149 | 6/2015 |
| SE | 1150308 | 10/2012 |
| WO | 98/53667 | 12/1998 |

OTHER PUBLICATIONS

International Search Report for PCT/FI2019/050671 mailed Dec. 9, 2019, 3 pages.

(Continued)

*Primary Examiner* — Michael A Riegelman
(74) *Attorney, Agent, or Firm* — Nixon & Vanderhye PC

(57) ABSTRACT

Disclosed is a new type of dosing device in a tree-processing device and a method for using it. The dosing device comprises a pump (2) to be attached to the processing device and a feed hose (15) connected to the pump (2) for leading the treatment agent fed by the pump (2) to the point of use. In the device is a replaceable treatment-agent cartridge (7) and the treatment-agent cartridge contains treatment agent. The cartridge is attached to the inlet port of the pump (2) by means of an adapter (4).

10 Claims, 5 Drawing Sheets

(56) References Cited

U.S. PATENT DOCUMENTS

| | | | | |
|---|---|---|---|---|
| 6,363,981 | B1* | 4/2002 | Butler | F16N 7/14 |
| | | | | 144/24.13 |
| 8,225,907 | B2* | 7/2012 | Soucy | B27B 17/12 |
| | | | | 184/26 |
| 9,133,983 | B2* | 9/2015 | Kettunen | F16N 7/38 |
| 2010/0147628 | A1* | 6/2010 | Soucy | B23D 57/02 |
| | | | | 184/15.1 |
| 2013/0213741 | A1* | 8/2013 | Ilmarinen | B27B 17/12 |
| | | | | 184/6.14 |
| 2013/0248294 | A1* | 9/2013 | Kettunen | B27B 17/12 |
| | | | | 184/26 |
| 2015/0306783 | A1* | 10/2015 | Yamaoka | F04B 53/16 |
| | | | | 83/169 |
| 2017/0021523 | A1* | 1/2017 | Haney | B27B 17/12 |
| 2017/0072584 | A1* | 3/2017 | Pellenc | B27B 17/02 |
| 2017/0120471 | A1* | 5/2017 | Kawamura | B27B 17/12 |
| 2017/0321844 | A1* | 11/2017 | Münker | F16N 19/00 |
| 2022/0030782 | A1* | 2/2022 | Puoskari | F16N 19/00 |

OTHER PUBLICATIONS

Written Opinion of the ISA for PCT/FI2019/050671 mailed Dec. 9, 2019, 9 pages.
FI Search Report for FI20185798 dated Apr. 23, 2019, 2 pages.
[Online] Fomatec Oy, "Fomatec Green Line ja Ph-Forest Oy", Youtube, URL:https://www.youtube.com/watch?v=6cRav0-0ux4, Jul. 3, 2018, 1 page.

\* cited by examiner

FEEDING DEVICE AND FEEDING METHOD ON HANDLING TIMBER

This application is the U.S. national phase of International Application No. PCT/FI2019/050671 filed Sep. 19, 2019 which designated the U.S. and claims priority to FI Patent Application No. 20185798 filed Sep. 25, 2018, the entire contents of each of which are hereby incorporated by reference.

FIELD OF TECHNOLOGY

The present invention relates to machines used in the harvesting and processing of a tree. In particular, the invention relates to harvesters and other devices travelling on the ground to fell trees and cut them to size, in which a tree is cut using a saw-chain and a saw bar, as well as the marking and treating of the tree with various treatment agents. More specifically, the invention relates to a dosing device and method, according to the preamble of claim 1, for example in a harvester's felling head.

BACKGROUND

In harvesters' felling heads chain saws are used to cut the tree in the felling stage and to cut it to size. In the sawmill industry similar cutting devices are used, which use chain oil for lubrication. The chain of chainsaws requires lubrication, which is done using chain oil dosed by a pump. Large amounts of oil in a liquid form are used and this should be environmentally-friendly and preferably biodegradable. Large amounts of mineral oil are also used. Oil is laborious to transport and the copious use of oil leads to expense. In harvesters, marking agents are also needed for marking timber that has been felled and sawn to size. There is a separate tank and nozzles for the marking agent in a suitable place in the felling head, for example in connection with the lower delimbing blade. The marking agent is transported to the work site in canisters and poured into the tank, so that the transportation and handing of marking agent is difficult. Because the marking-agent tank must be reasonably large, it is difficult to arrange several tanks for different colours.

There is therefore a need to improve the handling and use of liquids used in harvesters' felling heads.

SUMMARY

With the aid of various embodiments of the invention, the chain oil and marking agent used in felling heads can be replaced with grease, gel, powder, or some other treatment agent with a high viscosity, when less treatment agent will be needed. The treatment agent to be used is placed in replaceable cartridges, the transportation and use of which is easy and clean.

According to one embodiment of the invention, the dosing device comprises a pump attached to the felling head, a hose connected to the pump for leading the treatment agent fed by the pump to the point of use, and a replaceable cartridge and treatment agent contained in the cartridge, and an adapter for attaching the cartridge to the pump's inlet port.

According to a second embodiment of the invention, the treatment agent is grease or another substance used to lubricate the saw-chain, which lubricates the saw-chain and saw bar.

According to a third embodiment of the invention, the treatment agent is a colouring agent used to mark a cut tree.

According to a fourth embodiment of the invention, the pump is the felling head's chain-oil feed pump.

According to a fifth embodiment of the invention, the replaceable cartridge is formed from a cylindrical plastic tube.

According to a sixth embodiment of the invention, there is a thread in the replaceable cartridge for connecting it to the adapter.

According to a seventh embodiment of the invention, in the dosing device there is at least one pump for the saw-chain lubricating agent and at least one pump for the marking-colour agent.

According to an eighth embodiment of the invention, in the dosing device there are at least two nozzles for two colouring agents of two different colours.

According to a ninth embodiment of the invention, the method for using a dosing device according to at least one embodiment of the invention comprises the installation of a first replaceable cartridge, the feeding of the treatment agent to the point of use by a pump, the removal of the cartridge, and the installation of a new cartridge.

According to a tenth embodiment of the invention, the method comprises selection of the colour of the colouring agent and placing the selected colour-agent cartridge in place of the one removed.

More specifically, the invention is characterized by what is stated in the characterizing portion of the independent Claims.

BRIEF DESCRIPTION OF THE DRAWINGS

In the following, some embodiments of the invention are described in greater detail with reference to the accompanying drawings, in which.

EMBODIMENTS

Definitions

In the present context, the expression "treatment agent" covers the treatment agents used in timber harvesting taking place using a harvester, such as agents used to lubricate the saw-chain, colouring agent used to mark the tree, and, for example, agents used to protect the tree, fertilizers, seeds, or growth agents.

In this description, the term pump refers to devices intended to transfer a flowing substance.

The various embodiments of the invention are intended to facilitate the use of treatment agents used in the felling head of a harvester and particularly of saw-chain lubricants. This invention can be used everywhere or in machines and devices in which a tree is cut using a saw-chain and a saw bar, and also where a tree is marked. For example, in the sawmill industry, cutting devices are used that use saw-chain oil in lubrication. At the same time, with the aid of at least some embodiments, the consumption of these treatment agents can be reduced, which also facilitates their use and transportation. The treatment agents are packed in replaceable cartridges and the treatment agents are high-viscosity greases, gels, and similar, the consumption of which is less than that of oils and liquids in a more fluid form. The treatment agent is dosed using a pump. The pump can be the chain-oil feed pump in the felling head. The chain-oil pump usually in modern felling heads can also be used to feed grease suitable for lubricating the saw-chain. Grease adheres better to the chain and saw bar and its consumption is less than that of oil used in lubrication. Thus grease can be packed in small-capacity cartridges. Cartridges are easier to transport than oil canisters containing several litres and the cartridge or tank can be changed rapidly and the treatment agent is easy to transport because it is packed in small tubes or containers.

Figure 1:
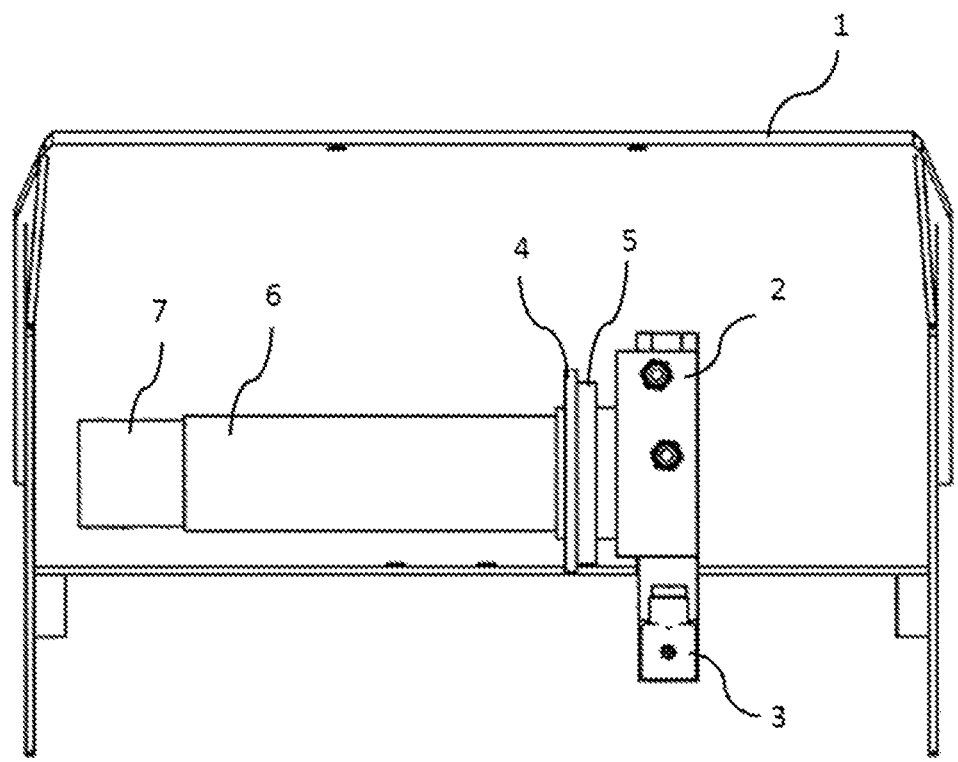
FIG. 1 shows a side view of the main components of a dosing device according to at least one embodiment of the invention.
Figure 2:
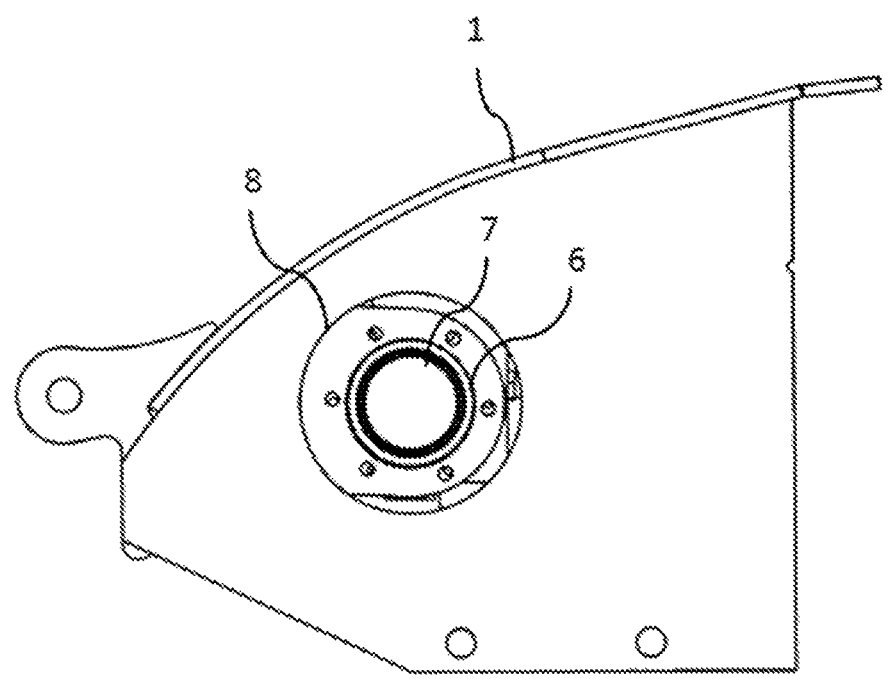
FIG. 2 shows an end view of the dosing device of FIG. 1.

FIG. 1 shows the components of a dosing device according to at least one embodiment of the invention, installed on a felling head's guard plate 1. In this example the guard plate is curved and forms a suitable space for the dosing device. The construction of felling heads varies and the location of the dosing device is determined in each felling head according to where it can best be fitted. In this example, the pump 2 is the chain-oil feed pump in the felling head. A chain-oil feed pump is already in each felling head, so that it is preferable to use it to implement the invention. The chain-oil feed pump is usually a hydraulically-operated piston pump, which is connected to the harvester's hydraulic system. The pump 2 is controlled by a solenoid 3, which is given an operating command to start feeding the lubricant. Chain-oil lubricant need not be fed continuously, particularly when using lubricating grease.

An adapter 4 is attached at the position of the inlet port of the pump 2. The adapter 4 consists of an attachment flange 5 and a shield tube 6. The attachment flange 5 attaches to the pump 2 and can have internal threads or other kings of alternative attachment elements to connect the treatment-agent cartridge 7 to the attachment flange 5 and through that to the pump 2. At one end of the guard plate 1 there is an opening 8 at the position of the adapter 4. The opening 8 is for the replacement of the treatment-agent cartridge. In the base of a felling head equipped with a guard plate according to FIG. 1, the opening 8 facilitates the replacement of the dosing device's treatment-agent cartridge 7 installed according to the example.

Figure 3:
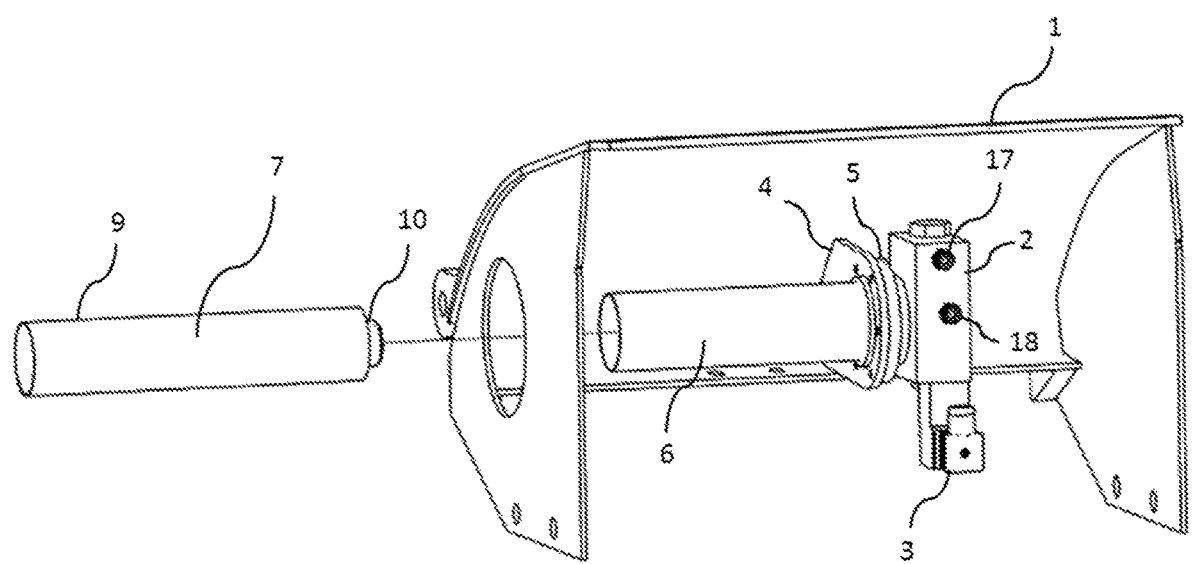
FIG. 3 shows the dosing device of FIGS. 1 and 2 in the second operating stage.

FIG. 3 shows the replacement of the treatment-agent cartridge 7. In this example, the treatment-agent cartridge 7 is a tubular cylindrical casing 9, at one end of which is a threaded connector nipple 10. Cartridges of this kind are widely used for the transportation and dosing of various greases, adhesives, sealing agents, and similar. Their storage space is usually a cylindrical tube, one end of which is open and at the opposite end is a connector nipple, by which the cartridge is attached to an operating device. The dimensions of the connector nipple vary manufacturer-specifically and instead of a thread other kinds of locking to the operating point can be used. The cartridge can, for instance, be pressed onto the feed device mechanically either in the longitudinal direction or by gripping it transversely from its outer surface. A threaded connection is, however, easy to implement and operationally reliable. The general capacity of a cartridge is 400 millilitres or 400 grammes. After filling, the cartridge is closed at its open end using a plug 19, which can move freely in the longitudinal direction of the cylindrical tub as the treatment agent is fed out of the cartridge. The dosing device's adapter's 4 shield tube supports the treatment-agent cartridge 7 during the movements of the felling head and protects it from impacts. The treatment-agent cartridge is replaced simple by rotating it from the attachment flange's 5 thread and rotating a new cartridge in place of the used one. The treatment-agent cartridge 7 is removed and installed through the opening 8 as shown in FIG. 3.

Figure 4:
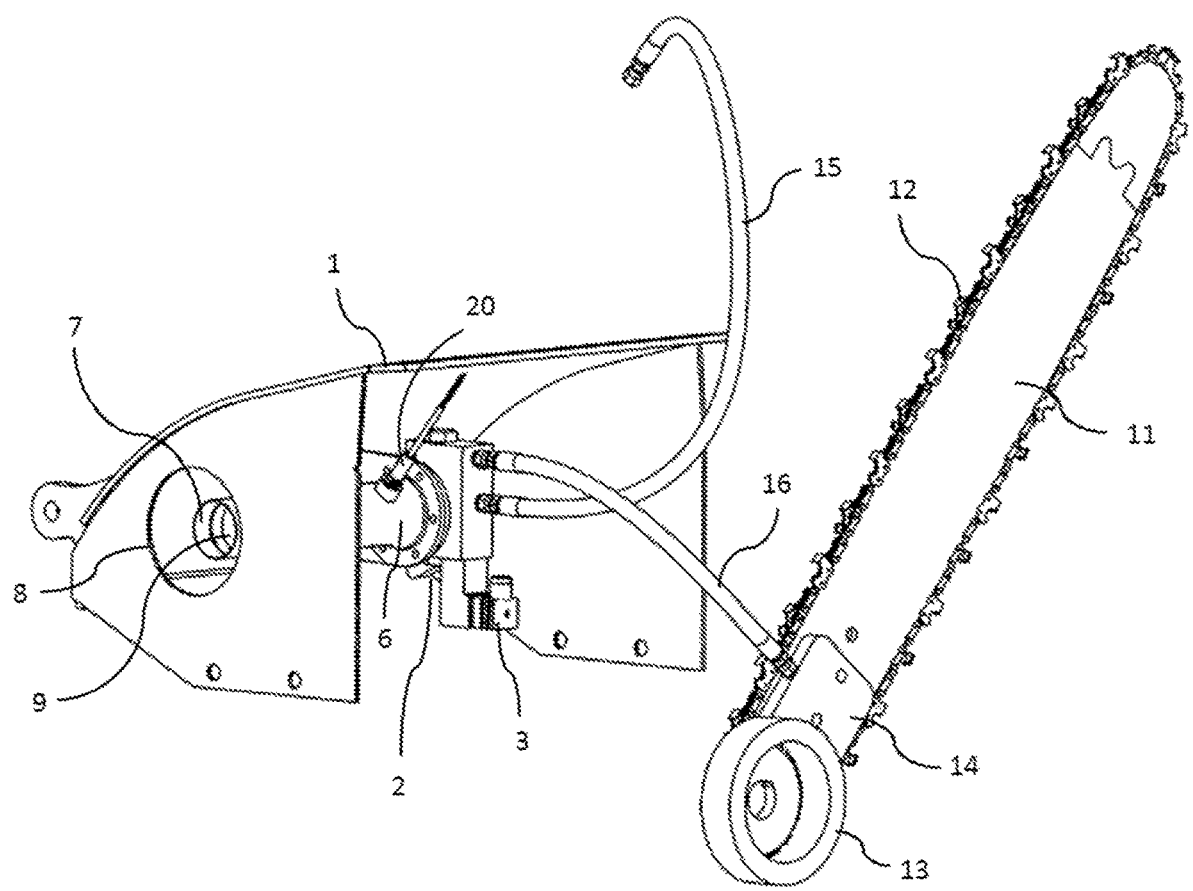
FIG. 4 shows a dosing device according to at least one embodiment of the invention.
Figure 5:
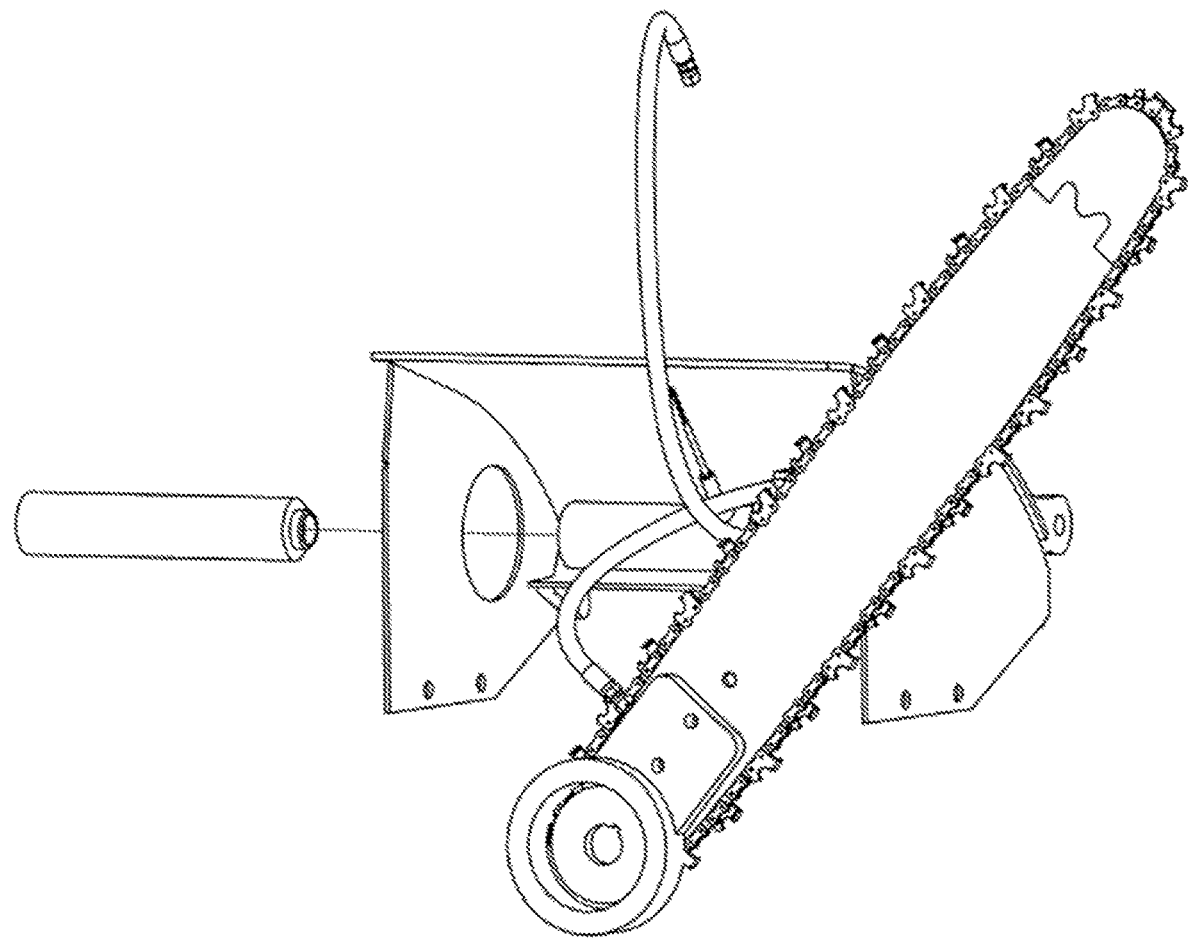
FIG. 5 shows the dosing device of FIG. 4 in the second operating stage.

FIGS. 4 and 5 show a dosing device, according to at least some embodiments of the invention, in its totality attached to a chain-saw's bar 11. The saw-chain 12 runs around the bar 11 and the bar 11 is attached to the felling head by a connector 13. The saw-chain's 12 lubricant is fed by a feed device 14. Here, the pump 2 is a hydraulically operated piston pump, which is controlled by a solenoid 3. Hydraulic pressure is brought to the pump's 2 hydraulic-pressure inlet port 18 by a pressure hose 15, which is connected to the harvester's hydraulic system. The pump's 2 treatment-agent outlet 17 is connected by a feed hose 16 to the feed device 14. The operation of the dosing device is such that when a command comes to the solenoid 3 to feed treatment agent, it starts the pump 2 and the pump 2 sucks treatment agent from the treatment-agent cartridge 7 and presses it along the feed hose 16 to the feed device, which lubricates the saw-chain 12 and the bar 11. The emptying of the treatment-agent cartridge 7 can be monitored visually through the opening 8. In this dosing device there is also a sensor 20 connected to the shield tube 6, which shows the emptying of the treatment-agent cartridge. There are many suitable sensor solutions and one versed in the art can select a suitable device for this purpose.

Figure 6:
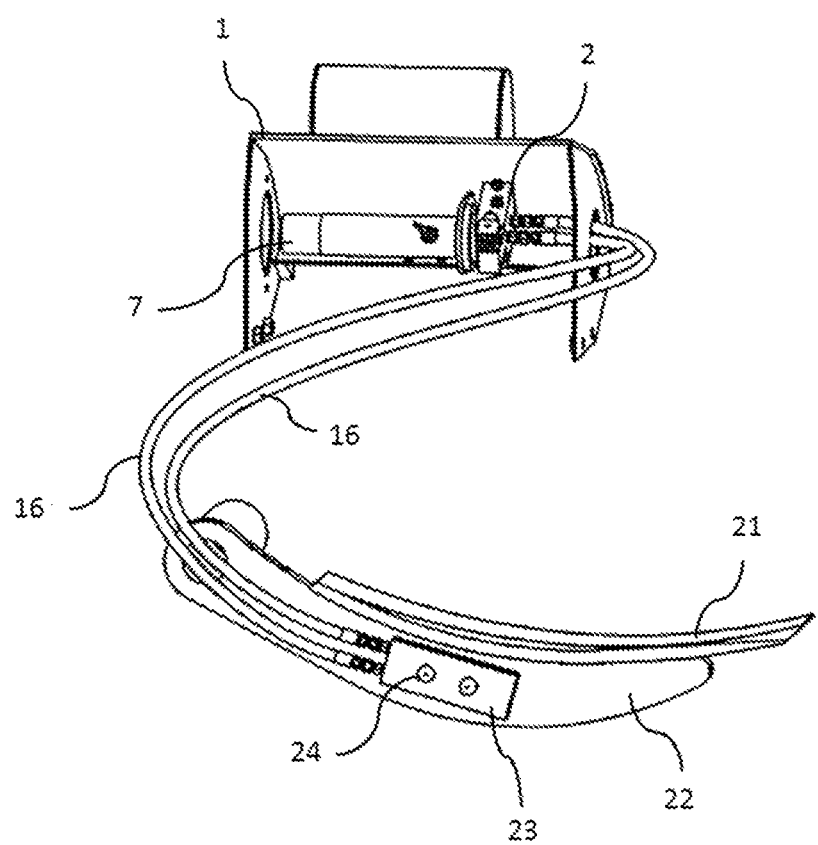
FIG. 6 shows a dosing device according to at least one second embodiment of the invention.

FIG. 6 shows a dosing device, which is particularly suitable for feeding a colouring agent to the end of a cut tree. In this embodiment, the dosing device's feed hoses 16 are taken to a nozzle frame 23 attached to the felling head's delimbing blade's 21 body 22. There are two feed hoses 16 and two nozzle openings 24 in the nozzle frame 23. When the trunk of the tree travelling against the delimbing blade 21 is cut, marking agent can be sprayed from the nozzle openings 24 onto the end of the cut trunk. In this way, for example the tree species or some other information used in collecting the tree can be marked in different colours. The example of FIG. 6 shows only one treatment-agent cartridge 7. These can be a desired number connected to one pump through a distributing connector or alternatively several pumps can be used, to which treatment-agent cartridges are connected as desired. The pump's outlet too can take place through a distributing valve. Thus the marking of the felled tree can be controlled as desired. Different markings can be created by varying and combining the colours, or by making one, two, or more markings on the end of the felled tree. For example, using two nozzle openings one colour can be used for one marking, or two making using the same or different colours. Thus already using two colours and two nozzle openings a great number of alternative marking codes will be obtained. The colours can of course be changed completely by changing the treatment-agent cartridge. Instead of the delimbing-blade body, the nozzle frame can be placed in any other position, from where the treatment-agent spray can aim at the end of the felled tree.

Colour-marking agent is used to differentiate tree species and the trees are marked in the felling stage. Tree-marking colour is usually a liquid, glycol, in which a colouring agent is mixed. In the dosing device according to the invention, colouring agent is preferably in a more gel-like form, which is easier to pack in a treatment-agent cartridge, and is spread by the dosing device. Of course the colouring agent can also be liquid. With the aid of at least some embodiments of the invention, the amount of colouring agent to be transported to the forest can be reduced. Now colouring agent is generally transported to the forest in 10-20-litre containers. With the aid of at least some embodiments of the invention, less colouring agent is used and goes to the forest in small tubes, treatment-agent cartridges. Treatment-agent cartridges like those depicted above are very suitable for the transport, storage, and dosing of different substances with a higher viscosity than fluid liquids. These are, for example, Vaseline-like greases and gels. Grease's advantage as a saw-chain lubricant is also that it adheres better to the chain and the bar's groove than a more fluid oil. Thus less lubricant is consumed when using grease. Grease-like and gel-like substances are easier to pack in cartridges, because their sensitivity to leaks is lower than that of oils and other liquids, for example glycol. In addition to lubricants and colour agents, the dosing device can be used to dose, for instance a biocide to repel fungal diseases or an anti-rot substance. Replaceable cartridges are also suitable for transporting powder, seeds, and similar substances.

As stated above, it is preferable to use the felling head's chain-oil feed pump as the dosing device's pump, because it is already in the felling head. This particularly concerns felling heads already in use. In new felling heads, the treatment-agent feed can be designed completely newly according to the principles of various embodiments of the invention and according to the requirements of the customer. It can then be envisaged that, for instance, commercially available greasing-system pumps, electrically operated pumps, or pneumatically operated pumps can be used. The dosing device's pump and equipment can also be located in the base machine itself, to which the felling head is attached, and the agents can be guided along hoses to the saw device or the colour nozzle or the fertilizer nozzle. This has the advantage that when the lubricants and colour containers are placed in the base machine, the felling head becomes lighter and easier to control. Cylindrical tubes like those described above are a cheap alternative as treatment-agent cartridges. They are available from several suppliers and the tubes can be collected and refilled after being emptied. As such, the invention in various preferred forms can use replaceable cartridges of other shapes too. All that is then needed is to manufacture a suitable adapter for the cartridge being used. The shape of the replaceable cartridge can be a square or a container or tube of some other shape and the cartridge can, in principle, be made from any material whatever. In one felling head there can be dosing devices for saw-chain lubricant, tree-marking colours, and even for other treatment agents. The system includes at least one or more nozzles. The nozzles can also be for different kinds and types of treatment agent and can be located in a suitable place in the felling head, or they can also be located in a suitable place in the base machine for spreading the treatment agent. This solution can, for example, be used when it is wished to spread, for instance, a fertilizing agent during cutting sawing or separately at some other time.

The use of a replaceable cartridge permits several different colours to be used in the cartridges while the colours are easy to transport in the machine due to the small package size. For example, in a situation in which a hectare is clear felled, and in the same clear felling there are several different landowners whose trees should be sorted by the forwarder into different stacks by the roadside, problems arise using the old method because there are generally two containers in the system and they are full or half-full of blue or red colour. If it is wished to change colour in the middle of felling the stand, for different forest owners the containers should be emptied of the old colour agent, and replace it with a new one, for example green.

With the aid of at least some embodiments of the invention, the colours can be easily changed in the middle of the work site by simply screwing out a colour cartridge and replacing it with, for instance a black one and spraying out the old colour agent from the hoses with a few test sprayings.

After use, a cartridge can be refilled. This replaceable container can be used many times. A cartridge can be installed in the machine, after which it can be refilled and placed back in the machine. The cartridge can of course also be single-use, but a much more ecological solution that creates less packaging waste is to make it able to be emptied in the machine and then refilled. The cartridge can be replaced from outside the machine, unlike a fixed container, which is filled with treatment agent by opening the cork and pouring agent into the treatment-agent container.

INDUSTRIAL APPLICABILITY

The invention can be applied in the felling heads of timber harvesters in the forest industry.

LIST OF REFERENCE NUMBERS 1 guard plate
2 pump
3 solenoid
4 adapter
5 attachment flange
6 shield tube
7 treatment-agent cartridge
8 opening
9 cylindrical sleeve
10 connector nipple
11 bar
12 saw chain
13 connector
14 feed device
15 pressure hose
16 feed hose
17 hydraulic pressure feed opening
18 outlet
19 plug
20 sensor
21 delimbing blade
22 delimbing blade body
23 nozzle frame
24 nozzle openings

The invention claimed is:

1. A timber processing device comprising a dosing device, the timber processing device being a harvester with a harvester head, the dosing device comprising:
   a pump attached to the timber processing device,
   a feed hose connected to the pump to lead a treatment agent fed by the pump to a point of use, the point of use comprising at least one nozzle for spreading the treatment agent,
   a replaceable treatment-agent cartridge, the treatment agent being contained in the treatment-agent cartridge, and
   an adapter configured to attach the treatment-agent cartridge to an inlet port of the pump,
   wherein the dosing device and the replaceable treatment-agent cartridge are installed on the harvester head, and
   wherein the harvester head is equipped with a chain saw.

2. The timber processing device according to claim 1, wherein the treatment agent is grease used to lubricate the saw-chain, or some other lubricant.

3. The timber processing device according to claim 1, wherein the treatment agent is a colour agent used to mark a felled tree.

4. The timber processing device according to claim 1, wherein the pump is the harvester head's chain oil feed pump.

5. The timber processing device according to claim 1, wherein the replaceable treatment-agent cartridge is formed from a cylindrical plastic tube.

6. The timber processing device according to claim 1, wherein in the replaceable treatment-agent cartridge there is a thread for attachment to the adapter.

7. The timber processing device according to claim 1, wherein there is at least one pump in the dosing device for saw-chain lubricant and at least one pump for marking agent.

8. The timber processing device according to claim 1, wherein in the dosing device there are at least two nozzle openings for colouring agents of two different colours.

9. A method for using the dosing device in the timber processing device according to claim 1, the method comprising installing a first replaceable treatment-agent cartridge, feeding the treatment agent by the pump to the point of use, removing the first treatment-agent cartridge, and installing a new treatment-agent cartridge.

10. The method according to claim 9, further comprising selecting a colour of a colouring agent and putting the selected colouring-agent cartridge in place of the removed one.

* * * * *